United States Patent
Morton

(10) Patent No.: US 6,855,259 B2
(45) Date of Patent: *Feb. 15, 2005

(54) PROCESS FOR REDUCING THE PASSIVE LAYER FROM THE SURFACE OF A METAL

(75) Inventor: Peter Morton, East Palo Alto, CA (US)

(73) Assignee: Canadus Technologies LLC, Warrensville Heights, OH (US)

(*) Notice: Subject to any disclaimer, the term of this patent is extended or adjusted under 35 U.S.C. 154(b) by 358 days.

This patent is subject to a terminal disclaimer.

(21) Appl. No.: 10/211,471

(22) Filed: Aug. 1, 2002

(65) Prior Publication Data

US 2003/0032572 A1 Feb. 13, 2003

Related U.S. Application Data

(60) Provisional application No. 60/309,836, filed on Aug. 3, 2001, provisional application No. 60/309,837, filed on Aug. 3, 2001, and provisional application No. 60/309,854, filed on Aug. 3, 2001.

(51) Int. Cl.[7] .................................................. C02F 1/42
(52) U.S. Cl. ................................ 210/688; 526/288
(58) Field of Search ........................ 210/681, 688; 526/288

(56) References Cited

U.S. PATENT DOCUMENTS

| | | | |
|---|---|---|---|
| 1,855,035 A | | 4/1932 | Vignos |
| 3,951,790 A | * | 4/1976 | Fujisawa et al. ............. 210/688 |
| 3,966,601 A | | 6/1976 | Stevenson et al. |
| 4,032,416 A | | 6/1977 | Cutler |
| 4,048,416 A | | 9/1977 | Axen et al. |
| 4,053,400 A | | 10/1977 | Merker et al. |
| 4,133,755 A | | 1/1979 | Tarao et al. |
| 4,239,865 A | | 12/1980 | Tarao et al. |
| 4,578,195 A | * | 3/1986 | Moore et al. ................ 210/679 |
| 4,971,775 A | | 11/1990 | Hoy et al. |
| RE34,272 E | | 6/1993 | Michaud et al. |
| 5,492,620 A | | 2/1996 | Evans |
| 5,615,862 A | | 4/1997 | Gaudette |
| 5,649,895 A | | 7/1997 | Fix et al. |
| 5,665,324 A | | 9/1997 | Izawa et al. |
| 5,772,776 A | | 6/1998 | Holbein |
| 5,908,559 A | | 6/1999 | Kreisler |
| 5,969,019 A | | 10/1999 | Kanai et al. |
| 6,274,045 B1 | | 8/2001 | Kreisler |
| 6,521,131 B1 | * | 2/2003 | Hamilton et al. ........... 210/662 |

FOREIGN PATENT DOCUMENTS

| | | |
|---|---|---|
| CN | 1069008 | 2/1993 |
| EP | 016989 | 8/1984 |
| JP | 52061124 | 5/1977 |
| JP | 52094888 | 8/1977 |
| JP | 53015283 | 2/1978 |
| JP | 53149189 | 12/1978 |
| JP | 9077275 | 11/1997 |
| JP | 2001288579 | 10/2001 |
| KR | 8501079 | 7/1985 |

OTHER PUBLICATIONS

Yoshida, H. et al., "Extraction of Several Metallic Complexes With Tetraethylthiuram Disulfide", Bunseki Kagaku, 1967, vol. 16(6), pp. 605–607, no month available.

(List continued on next page.)

Primary Examiner—Necholus Ogden
(74) Attorney, Agent, or Firm—Dergosits & Noah LLP; Samuel S. Lee

(57) ABSTRACT

The present invention is directed to a process for reducing the passive layer on a metal. The process includes reacting a treatment composition having a non-metallic compound with metal ions in the passive layer of a metal, thereby forming an organometallic complex precipitate, and removing the organometallic complex precipitate. In one embodiment the non-metallic compound is a thiuram. In another embodiment, the treatment composition further includes a non-metallic compound that is a dithiocarbamate.

20 Claims, 1 Drawing Sheet

OTHER PUBLICATIONS

Kakowski, I.A., "Reaction Between Disulfides and the Surfaces of Metals", Revista Minelo, 1957, vol. 8, pp. 499–502, no month available.

Mendoza, C.S. et al., "Silver Extraction for Pollution Control of Photographic Fixing Solution with Tetramethylthiuram Disulfied", Bulletin of the Chemical Society of Japan, 1996, vol. 69(12), pp. 3499–3504, no month available.

Mendoza, C.S. et al., "Thiuram Sulfides as a Reagent for the Solvent Extraction of Silver", Analytical Sciences, 1996, vol. 12(6), pp. 969–972, no month available.

Kobayashi, N. et al., "Sulfur–Containing Polymers XIX, Adsorption of Mercury From Aqueous Solutions By Thiuram Polysulfide Polymers", Journal of Polymer Science, Polymer Letters Edition, 1977, vol. 15(3), pp. 137–140, no month available.

U.S. Appl. No. 10/212,028, Filed Aug. 1, 2002, Inventor: Peter Morton, Title: Compositions for Removing Metal Ions from Aqueous Process Solutions and Methods of Use Thereof.

U.S. Appl. No. 10/211,406, Filed Aug. 1, 2002, Inventor: Peter Morton, Title: Composition for Removing Metal Ions From Aqueous Process Solutions and Methods of Use Thereof.

Lezzl et al., Chelating Resins Supporting Dithiocarbanate and Methylthiourea Groups in Adsorption of Heavy Metal Ions, 1994 Journal of Applied Polymer Science, vol. 54, pp. 889–897.

* cited by examiner

US 6,855,259 B2

PROCESS FOR REDUCING THE PASSIVE LAYER FROM THE SURFACE OF A METAL

CROSS-REFERENCE TO RELATED APPLICATION

The present invention claims priority to U.S. provisional patent application Nos. 60/309,836, 60/309,837 and 60/309,854, all filed on Aug. 3, 2001, which are all incorporated herein by reference in their entirety.

FIELD OF INVENTION

The present invention describes a composition and process using the composition for reducing the passive layer from the surface of a metal.

BACKGROUND OF THE INVENTION

Various metals are useful in many industrial processes. However, due to undesirable chemical reactions, e.g., environmental oxidation, a passive layer can form on the surface of the metals. Such passive layers can decrease the amount of useful surface area of the metal.

For example, metallic replacement technology is one method that is often utilized to remove metal ions from aqueous waste solutions (hereafter also referred to as aqueous process solutions). In this technology, iron is contacted with aqueous process solutions containing metal ions. As is well known in the art, the metal ions in the aqueous process solution are removed by reaction with the iron surface. As a result of chemical reactions that can occur in an oxygen rich environment, however, a passive layer of iron oxide can form on the surface of the iron metal. It is believed that the metallic replacement does not occur with the passive layer. Since the passive layer can significantly reduce the surface area of iron metal available to provide metallic replacement, the amount of metallic replacement can be reduced proportionally to the available surface area.

Similarly, passive layers can form on the surface of many metal catalysts, which results in a decrease of useful surface area. Since the rate of the total reaction is typically proportional to the available surface area of the metal catalyst, total reaction rates can be improved by removing these passive layers.

Accordingly, there is a need for reducing the passive layer that can form on the surface of various metals.

SUMMARY OF THE INVENTION

The present invention is directed to a process that reduces the passive layer on the surface of metals. The process includes reacting a treatment composition having a non-metallic compound with metal ions in the passive layer of a metal, thereby forming an organometallic complex precipitate, and removing the organometallic complex precipitate from the surface of the metal. When the process is conducted in an aqueous solution, the aqueous solution preferably includes a wetting agent. In one embodiment, the non-metallic compound is a thiuram. In another embodiment, the treatment composition further includes a non-metallic compound that is a dithiocarbamate. The present invention is also directed to the metal obtained from this process.

In another embodiment, the present invention is directed to a process for reducing the passive layer on the surface of a metal in situ, wherein the metal is treated without being removed. The process includes reacting, in an aqueous solution having a wetting agent, a treatment composition having a non-metallic compound with metal ions in the passive layer of the metal, thereby forming an organometallic complex precipitate, and removing the organometallic complex precipitate from the surface of the metal. In one embodiment, the aqueous solution is an aqueous process solution.

In another embodiment, the present invention is directed to an apparatus for removing the passive layer on the surface of a metal. The apparatus includes an enclosed shell having an inlet, an outlet, and at least two interior compartments, wherein the inlet, the compartments, and the outlet are fluidly connected. A treatment composition having a non-metallic compound is placed in at least one compartment near the inlet, and the metal is placed in at least one compartment located in fluid sequence after the compartment having the treatment composition. As described in the processes above, the non-metallic compound is capable of reacting with metal ions in the passive layer of the metal to form an organometallic complex precipitate.

DETAILED DESCRIPTION OF THE INVENTION

Figure 1:
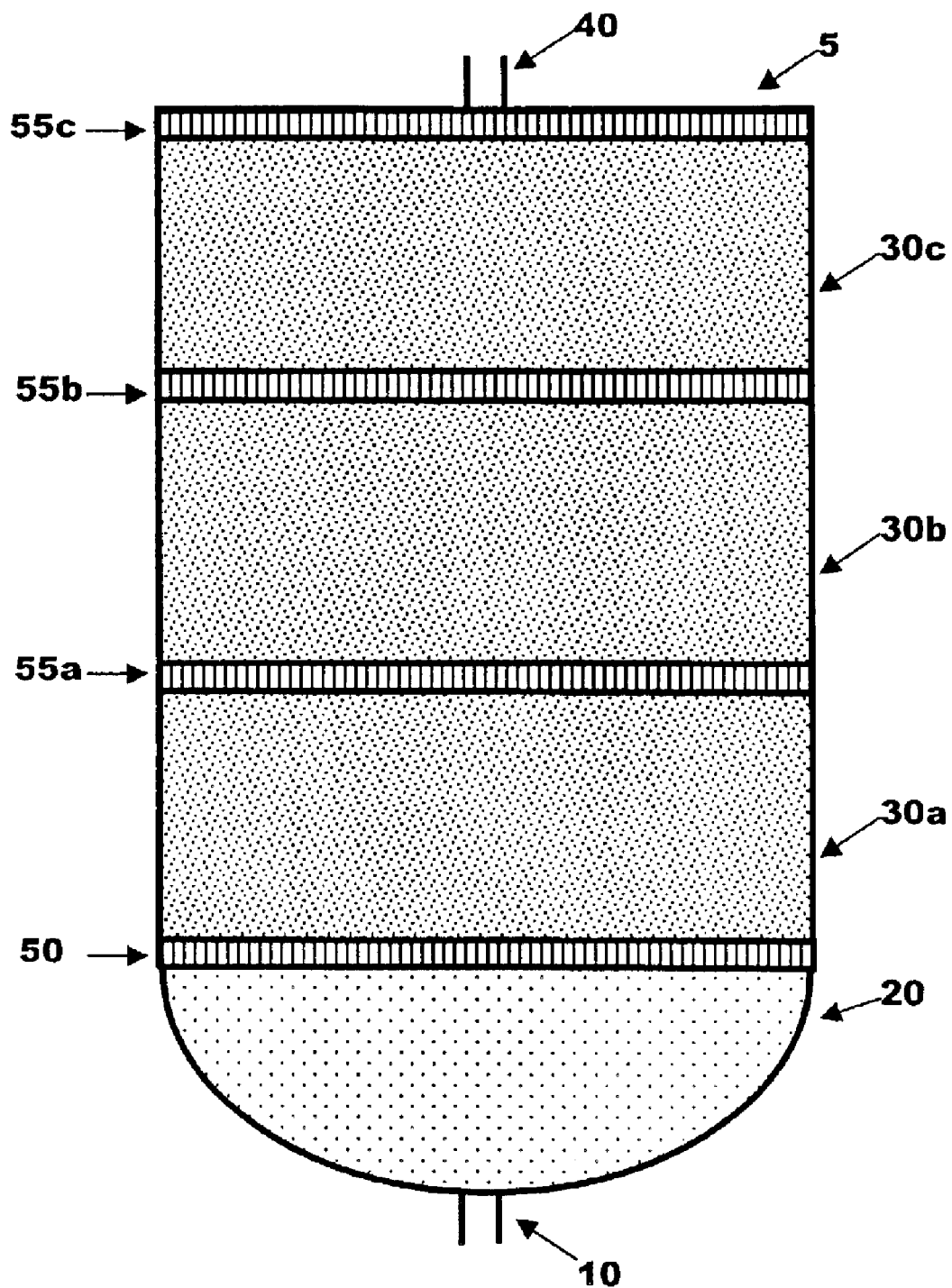
FIG. 1 is an apparatus illustrating one embodiment of the present invention.

The present invention provides treatment compositions and processes using the compositions to reduce the amount of a passive layer formed on the surface of a metal. The present invention is also directed to the resulting treated metal and organometallic complexes resulting from the processes. The metal can be any metal in Groups IB through VIIB and VIII of the periodic table (according to CRC Handbook of Chemistry and Physics, 62nd Edition, 1981–1982), including the elements having the atomic numbers of 58–71 and 90–103, aluminum, gallium, indium, thallium, germanium, tin, lead, antimony, bismuth, mixtures thereof and alloys thereof. The metal is preferably selected from the group consisting of scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, hafnium, thallium, tungsten, rhenium, osmium, iridium, platinum, gold, mixtures thereof, and alloys thereof. The term "passive layer," as used herein, refers to a layer formed on the surface of the metal as a result of one or more undesirable chemical reactions of the metal. The surface passive layer typically includes the metal ion associated with one or more ionic chemical compounds, such as an oxide, which interferes with the maximum utilization of the metal. In other words, the metal in the passive surface layer is formally electron deficient. For example, iron metal is useful in many chemical reactions, such as metallic replacement. As a result of chemical reactions that can occur in an oxygen rich environment, however, a passive layer of iron oxide can form on the surface of the iron metal. The passive layer can significantly reduce the surface area of iron metal available to provide metallic replacement.

In one aspect of the present invention, a process is provided to substantially remove the passive layer from the surface of a metal by contacting the metal with a treatment composition having a non-metallic compound of the present invention. Without wanting to be limited by any one theory, it is believed that the non-metallic compounds of the present invention associates with the metal ions in the passive surface layer to form an organometallic complex. The organometallic complex is in the form of a precipitate that can be separated by any process or method known to the skilled artisan. Accordingly, it is believed that the non-metallic compounds of the present invention significantly reduce the passive surface layer, thereby increasing the surface area of the metal that is available for utilization in any subsequent reaction or process.

As is well known to the skilled artisan, the metal can be in any form typically used in the subsequent reaction or process. Preferably, the metal is in a form that maximizes the surface area per mass. Examples of suitable forms of metal include, but are not limited to, pellets, powders, beads, fine mesh, cut wire, and wool. For example, iron metal in the form of fine mesh or wool is used in metallic replacement technology. These forms of iron metal are commercially available, e.g., from Silver Sure, Inc., Pioneering Services Co., CPAC, Inc., and American Metal Fibers.

The treatment compositions of the present invention include from about 1.0% to 100%, preferably from about by 50% to about 99.99%, by weight of the composition, of a non-metallic compound, which associates with the metal ion, and from 0.0% to about 99.0%, preferably from about by 0.01% to about 50%, by weight of the composition, of an appropriate carrier. The treatment compositions can be provided in dry or liquid forms. Accordingly, the carrier can be any liquid or solid material known to the skilled artisan that is either neutral in its effect or enhances one or more properties of the non-metallic compound, e.g., storage and handling properties. An example of an appropriate carrier is mineral oil.

In one embodiment of the present invention, the treatment compositions of the present invention include a non-metallic compound that is a thiuram, which can also be referred to as thiram. The thiuram is sparingly soluble in aqueous solutions. The term "sparingly soluble," as used herein, means that less than 0.1% by weight of the material is soluble in water. Without wanting to be limited by any one theory, it is believed that the non-metallic compounds of the present invention are capable of forming an organometallic complex with a metal ion. The organometallic complex becomes a precipitate that can then be separated by any separation technique or method known to the skilled artisan. Nonlimiting separation techniques or methods include filtration, gravity settling, centrifugation, flocculation, cake filtration, membrane filtration, sieving, and floatation (liquid/air filtration).

One group of thiurams can be characterized by the general chemical formula (I), as illustrated below.

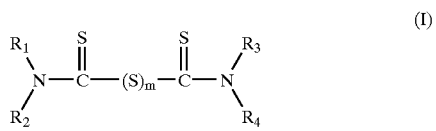

(I)

wherein, m is an integer of 1 or 2; and $R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls. As is well known to the skilled artisan, any of the carbon atoms or hydrogen atoms in each of the above described R-groups can be substituted with chemical moieties that tailor the performance of the non-metallic compound without significantly effecting the requisite solubility properties.

Examples of useful non-metallic compounds of formula (I) include, but are not limited to, tetramethylthiuram monosulfide (CAS# 97-74-5); bis(dimethyldithiocarbamoyl) disulfide (CAS# 137-26-8); tetrabenzylthiuram disulfide (CAS# 10591-85-2); tetraethylthiuram disulfide (CAS# 97-77-8); tetrabutylthiuram disulfide (CAS# 1634-02-2), dipentamethylenethiuram tetrasulfide (CAS# 120-54-7), and mixtures thereof.

In another embodiment of the present invention, the treatment compositions of the present invention further include a water soluble, non-metallic compound that is a dithiocarbamate. One group of dithiocarbamates can be characterized by the general chemical formula (II), as illustrated below.

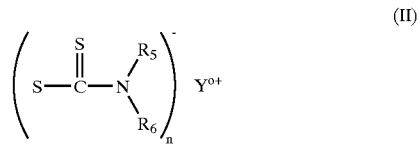

(II)

wherein, n is an integer of 1 or 2; o is an integer of 1 or 2; $R_5$ and $R_6$ are individually selected from the group consisting of C1–C10 linear alkyls, C3–C10 branched alkyls, C3–C10 cyclo-alkyls, and substituted and unsubstituted aryls; and Y is an element selected from Groups IA and IIA of the periodic table. As is well known to the skilled artisan, any of the carbon atoms or hydrogen atoms in each of the above-described R-groups can be substituted with moieties that enhance the performance of the non-metallic compound.

Examples of useful non-metallic compounds of formula (II) include, but are not limited to, sodium dimethyldithiocarbamate (CAS# 128-04-1), sodium diethyldithiocarbamate (CAS# 148-18-5), sodium dibenzyldithiocarbamate (CAS# 55310-46-8), sodium dibutyldithiocarbamate (CAS# 136-30-1), and mixtures thereof.

The metal can be contacted with the treatment composition in a wet process. Typically, the metal can be dipped in an aqueous solution containing the non-metallic compound. The term "aqueous solution," as used herein, means containing greater than about 50%, by weight of the solution, of water or a water miscible solvent. Since the non-metallic compound is sparingly soluble in the aqueous solutions, it is preferred to employ any of the known mixing technologies during and introduction into the aqueous solution.

The wet process can be conducted at a wide variety of reaction variables, which can be tailored for optimization. As in any chemical reaction, increasing the reaction or retention time, i.e., duration of physical contact of the non-metallic compound and the metal, is beneficial to increasing the quantity and size of the precipitated organometallic complex. Accordingly, it is preferred to maximize the reaction or retention time as much as allowable taking into consideration other process and economic variables. Typically, the reaction or retention time is at least 0.1 hours, preferably from about 0.5 hours to about 125 hours, and more preferably from about 1 hour to about 50 hours. As is well understood by the skilled artisan, lower reaction or retention times can be needed at higher reaction temperatures. The reaction can be conducted at a temperature of from about 5° C. to about 99° C., preferably from about from about 10° C. to about 40° C. The present process can be conducted at a wide range of pH's, especially if the process is conducted in a substantially oxygen-free environment. However, due to the increased possibility of organic materials being degraded by oxidized metal ions in oxygen rich environments, e.g., Fenton's reaction, it is preferred to conduct the process at a pH of greater than or equal to about 3.0, preferably from about 4 to 12, and more preferably from about 7 to 12. It is also believed that the present processes may provide better removal of metal ions at lower surface tensions, e.g., at about the surface tension of 1% by weight of acetic acid in water.

In one embodiment of the present invention, the wet process includes introducing the metal into an aqueous solution containing the treatment compositions of the present invention in batch or continuous systems. Such systems can be run in parallel and/or in series. Such systems typically utilize a container, such as a tank, containing the aqueous solution, and the container is adapted to provide mixing, e.g., by utilizing any mixing technology known to the skilled artisan. As is well known to the skilled artisan, introduction of air into a system, having a minority of hydrophobic components in a majority of hydrophilic components, can result in an emulsion. Such emulsions typically form a layer on top of the hydrophilic phase. The emulsion layer, therefore, can be removed by utilizing skimming technology known in the art. If a skimming technology is not employed, the formation of an emulsion layer can be prevented by minimizing the introduction of air into the system after the treatment composition is added to the aqueous solution. For example, mixing can be controlled to prevent the introduction of a vortex by placing a blade in an off-center position at the bottom of the tank. Alternatively, the tank can have a floating top that significantly reduces the amount of air on top of the mixture in the tank.

The treatment composition can be added to the aqueous solution, e.g., in a concentration that is proportion to the estimated amount of metal ions present on the surface of the metal, by any well-known method of addition, e.g., by metering. In this embodiment, the non-metallic compound is added at a concentration of from about 1.0:1.0 to about 1.0:4.0, preferably from about 1.0:1.2 to about 1.0:3.0, and more preferably from about 1.0:1.5 to about 1.0:2.5 by molar ratio of the non-metallic compound to the metal ions present in the aqueous process solution. More of the non-metallic compound may be needed at lower pH's, e.g., below about pH 4, and/or in oxygen rich environments.

In wet processes, the aqueous solution also preferably has a wetting agent in a concentration from about 0.01 molar to 10 molar, more preferably from about 0.025 molar to 0.5 molar, and most preferably from about 0.05 molar to 0.25 molar. Wetting agents, also known as surfactants, are compounds that reduce the surface tension of liquids, or reduce interfacial surface tension between two liquids or a liquid and a solid. It is, therefore, believed that the wetting agent helps to lower the barrier of reaction. Wetting agents may be soluble in both organic and water solutions, however, it is preferred that the wetting agents used herein be at least soluble in the aqueous solution at the concentrations used. General categories of useful wetting agents include, but are not limited to, non-ionic surfactants, anionic surfactants, cationic surfactants, carboxylic acids, alcohols, and amines. Zwitter-ionic and amphoteric surfactants may also be useful. Examples of useful wetting agents are disclosed in the Kirk-Othmer Encyclopedia of Chemical Technology (John Wiley and Sons, New York), U.S. Pat. No. 6,399,676 issued to Labude, et al. on Jun. 4, 2002, and U.S. Pat. No. 6,087,312 issued to Masotti, et al on Jul. 11, 2000, all of which are incorporated herein by reference in their entirety. Examples of useful wetting agents include, but are not limited to, acetic acid, propanoic acid, methanol, ethanol, propanol, tetraethyl ammonium hydroxide, fatty acids and salts thereof, alkylaryl sulfonates, and mixtures thereof.

Wet process embodiments also include a separation step after the completion of the reaction, or after the end of the appropriate reaction or retention time. Any separation technology or method known to the skilled artisan can be used to separate the organometallic complex precipitate from the aqueous solution, e.g., settling, centrifugation, filtering, and the like. In continuous systems, a separation device can be placed in series to the mixing container. The resulting precipitate can then be further processed, as described hereinafter.

Optional ingredients known to the skilled artisan can also be used to aid in or optimize any of the process steps described above. For example, flocculating agents can be used to aid in the settling process. Nonlimiting examples of flocculating agents include acrylates. Also, antifoaming agents can also be used in the mixing step, assuming that the degree of agitation is not changed. Nonlimiting examples of antifoaming agents include silicone oils.

The treated metal, which now has a decreased amount of the passive layer, can then be utilized in any subsequent process or chemical reaction. For example, iron metal treated with the treatment compositions of the present invention can then be utilized in metallic replacement technology.

Although it is recommended that the treated metal be used for its intended purpose as soon as possible after completing the process described above, the treated metal can also be stored for later use by anaerobically sealing the treated metal. As is well known in the art, the treated metal can also be stored in a chemically inert environment, e.g., in nitrogen gas or pure distilled water.

As described above, it is believed that the non-metallic compounds react with metal ions in the passive layer to form an organometallic complex. Without wanting to be limited by any one theory, it is believed that the metallic ion associates to one or more sulfur groups on the non-metallic compound via van der Waals forces, ionic forces, delta bonds, and/or sigma bonds. The recovered organometallic complex, therefore, can be further processed to recover the metal ions as native metal by removing these attractive forces by any method known to the skilled artisan. Alternatively, the complexed non-metallic compound can simply be removed by any method known to the skilled artisan. Examples of suitable removal techniques include, but are not limited to, oxidization, degradation, acidification, and flame refining.

In one embodiment of the present invention, the metal is iron and the passive layer may include iron oxide. The processes described above can be used to substantially remove the iron oxide passive layer, thereby enhancing the activity of the iron metal in any desired chemical reaction or process. For example, iron metal is used in metallic replacement technology to treat aqueous process solutions. Metallic replacement technology is well known in the art, as illustrated in the following published documents and books: EPA 530-K-99-002; and Processing Kodak Motion Picture Films, Module 5, "Chemical Recovery Procedures" (Eastman Kodak Co. 2000). The term "aqueous process solution," as used herein, means any liquid containing from about 1 ppm to about 15,000 ppm of metal ions. The term "about," as used herein, means plus or minus 10% of the referenced value. Nonlimiting examples of aqueous process solutions include the processing solutions from the following technologies: photography, photothermography, thermography, lithography, metallurgy, semiconductor polishing, and x-ray imaging. The term "metal ion," as used herein, means the soluble form of any metal in Groups IB through VIIB and VIII of the periodic table, including the elements having the atomic numbers of 58–71 and 90–103, aluminum, gallium, indium, thallium, germanium, tin, lead, antimony, bismuth, mixtures thereof, and alloys thereof. Metal ions of particular interest are those identified in the Resource Conservation Recovery Act (RCRA). The metal ions are preferably selected from the group consisting of arsenic, barium, cadmium, chromium, cesium, copper, iron, lead, mercury, nickel, selenium, silver, technetium, thallium, zinc, actinides, lanthanides, mixtures thereof, and alloys thereof.

Aqueous process solutions treated with metallic replacement technology utilizing the iron metals according to the present invention can provide metal ion levels of less than about 100 ppm, preferably less than about 20 ppm, more preferably less than about 5 ppm, and most preferably less than about 0.3 ppm of metal ions.

In another aspect of the present invention, the process for reducing the passive layer on the surface of metal can be conducted at or about the same time as the process of using the metal, i.e. for its intended use, in an aqueous process solution. Since this is a wet process, it is preferred to adjust the concentration of the wetting agent in the aqueous process solution, if needed, to an appropriate level, as discussed above. However, the aqueous process solution may already have the desired concentration of a suitable wetting agent. For convenience, this process is referred to hereinafter as the "in situ activation" of the metal, because the passive layer on the metal can be removed without separate processing or removal from the reaction apparatus. For example, in metallic replacement, the passive layer on the surface of the iron wool may be removed while the iron wool is being used to remove silver ions from an aqueous process solution.

In one embodiment, in situ activation of the metal can be achieved by mixing or contacting the treatment composition of the present invention with the aqueous process solution before it contacts the metal. If competing reactions between the treatment composition and the process solution are a concern, the retention time or time of reaction between the treatment composition and the process solution can be minimized in order to maximize the reaction between the treatment composition and the metal ions in the passive layer. Retention times (i.e., after contact between the treatment composition and the process solution) can be controlled to be less than about 120 minutes, preferably less than 60 minutes, and more preferably less than about 30 minutes. Accordingly, the treatment compositions of the present invention can be added to or mixed into the aqueous process solution in a tank and then contacted with the metal shortly thereafter.

Alternatively, a treatment container having the treatment composition can be placed in fluid communication in between a tank containing the aqueous process solution and a reaction vessel containing the metal. Since the inlet of the treatment container is fluidly connected to the tank and the outlet of the treatment container is fluidly connected to the reaction vessel, the retention time or time of reaction between the treatment composition and the process solution can be minimized. Furthermore, since some of the non-metallic compounds in the treatment composition are sparingly soluble in the aqueous process solution, the concentration of the treatment composition that is added can be controlled by varying the amount of the treatment composition, varying the flow rate of the process solution through the treatment container, or both. As would be evident to the skilled artisan, the amount of treatment composition used can vary depending on various factors, such as, flow rate of the process fluid, the total amount of the aqueous process solution, operating temperatures, and amount of reactive metal. Typically, however, the treatment composition to reactive metal weight ratio can be in the range of from about 1:3 to about 1:5, and preferably from about 1:4 to about 1:5.

The treatment container can be a bag filter, which is commonly known in the art. Alternatively, the treatment container can be part of a unitary apparatus, which also includes the reaction vessel. One embodiment of such a unitary apparatus is provided in FIG. 1. As illustrated in FIG. 1, the unitary apparatus can be in the form of a column 5, which includes an inlet 10 fluidly connected to a compartment containing the treatment composition of the present invention 20, which is fluidly connected to one or more reaction compartments containing the metal 30a, 30b, and 30c. The column also includes an outlet 40 fluidly connected to the last reaction compartment. A perforated disk (not illustrated), maybe of a suitable material, can be put flush against the inlet port to maintain the treatment composition within the column while allowing fluid flow into the column. Furthermore, the treatment composition can be enclosed in a porous flexible container (not illustrated) made of any durable material, such as nylon, polyester or cotton.

The individual compartments of column 5 can be formed in any manner known to the artisan, as columns having a plurality of compartments are regularly used in the chemical arts. For example partition 50 can include a porous filter and a flexible disk to hold the filter in place. The filter can be made of any suitable porous material having a pore size of from about 1 micron to about 500 microns. Suitable materials include, but are not limited to, cellulose, polyester, polyolefin, cotton, and like materials. In order to provide a snug fit in the column, the filter preferably has a slightly larger diameter than the inner diameter of the column. The flexible disk, typically having perforations to allow fluid flow, can be made of a material that provides a seal with the inner diameter of the column. Suitable materials for the flexible disk include, but are not limited to, 3 M type 7200 pad or the like materials. The partitions between the reactive metal (55a, 55b, and 55c) can be made of any durable material that allows sufficient fluid flow. Nonlimiting examples of partition materials include nylon, polyester or cotton.

The outer surface of the column can be made of any material known in the art that has little or no chemical reaction with the reactive metal, the aqueous process solution, and the treatment composition. It is also preferred to use a material that is strong enough to withstand the pressures associated with the flow rates of the process solution. Nonlimiting examples of useful materials include plastics, such as polyethylene, polypropylene, and polyvinyl chloride. As is well known in the art, the dimensions and process parameters of the column can vary widely according to a particular use. Typically, the internal diameter of the column can be from about 1 in. (2.54 cm.) to about 100 in. (254 cm.), preferably from about 6 in. (15 cm.) to about 12 in. (30.5 cm.), and the height of the column can be from about 4 in. (10.2 cm.) to about 120 in. (305 cm.), preferably from about 6 in. (15.2 cm.) to about 72 in. (183 cm.). Depending on the configuration and size of the column, typical flow rates can be from about 0.1 gallon (0.38 l.) per hour to about 1,000 gallons (3,800 l.) per hour, preferably from about 1 gallon (3.8 l.) per hour. As is well known in the art, the flow rates can further depend on the number of columns used.

EXAMPLES

Example 1

Activation of Iron Wool

Iron wool was purchased from International Steel Wool, as course iron wool. About 27 pounds of the iron wool was placed into a column and sealed except for inlet and exit valves. About 10 pounds (4.5 kg.) of bis (dimethyldithiocarbamoyl)disulfide (CAS# 137-26-8) in pellet form (2–6 millimeter) were then placed into another column so that liquid is allowed to flow through the column while contacting the bis(dimethyldithiocarbamoyl). Alternatively, it is well known to the skilled artisan that a 5 micron bag filter can be used to contain the bis (dimethyldithiocarbamoyl). Such bag filters are commercially available from Filter Specialist, Inc. The two columns (or column and bag filter) were then fluidly connected to each other with a pump placed in between at least one of the connections to induce fluid flow. The two columns (or column and bag filter) can be connected in any manner to provide one way fluid flow. In this particular experiment, the outlet and inlet were placed on the top of each column.

The two columns (or column and bag filter) were then filled with an aqueous solution of photochemical fixer (e.g., Agfa photochemical fixer) reportedly having about 89% by weight of water, about 10% by weight of ammonium thiosulfate (CAS# 7783-18-8), and less than about 1% by weight of acetic acid (CAS# 64-19-7). The aqueous solution had a pH of about 7.0. It is preferred to use water having low oxygen content, e.g., the oxygen content of non-aerated boiled water. The acetic acid can be substituted with any other carboxylic acid or salt thereof, e.g., ammonium acetate (CAS# 631-61-8) and propanoic acid (CAS# 79-09-04). The solution can contain a higher percentage of carboxylic acid to achieve the same effect of decreasing surface tension. The solution was pumped through the two columns (or column and bag filter) at a temperature of about 25° C. so that some of the non-metallic compound flowed with the aqueous solution and contacted the iron wool. The reaction was continued until the iron was cleaned. For newly manufactured iron wool, the reaction time was about 48 hours. For older wool having a thicker passive layer, however, greater reaction times may be needed, e.g., about 150 hours or more. The amount of the treatment composition necessary is proportional to the amount of the passive layer to be removed. For new iron wool, about 10 pounds (4.5 kg.) of the treatment composition generally treats about 30 pounds (13.6 kg.) of iron wool.

The resulting iron wool was utilized to remove silver ions from a mixed photochemical solution (e.g., containing fixer, bleach-fix, and developer) having silver ions at a concentration of about 50 ppm. About 2,000 gallons (7570 L.) of this solution was pumped at an average rate of about 8 gallons (30.3 L.) per minute through twelve columns containing the treated iron wool, which columns were assembled in series, to yield about 0.2 ppm silver ion concentration, as determine by atomic adsorption flame spectroscopy. In a similar experiment, about 2,000 gallons (7570 L.) of mixed photochemical solution (e.g., containing fixer, bleach-fix, and developer) having silver ions at a concentration of about 40 ppm was treated using twelve standard columns (i.e., containing untreated iron wool) of exactly the same size and configuration of the columns containing the treated iron wool. This photochemical solution was pumped at an average rate of about 1.2 gallons (4.5 L.) per minute through the standard columns assembled in series to yield 3.6 ppm silver ion concentration, as determine by a Perkin Elmer flame atomic absorption spectrometer. The procedure for using such atomic absorption spectrometers to obtain concentrations of metal ions is well known in the art. Therefore, the columns containing the treated iron wool were able to treat a mixed photochemical solution with 25% greater silver ion concentration (50 ppm versus 40 ppm) over 6.5 times faster (8 gpm versus 1.2 gpm) to yield a significantly lower silver ion concentration (0.2 ppm versus 3.6 ppm).

Example 2

Activation of Iron Wool—In Situ

Iron wool was purchased from International Steel Wool, as coarse iron wool. About 27 pounds (12.2 kg.) of the iron wool was placed into a column and sealed except for inlet and exit valves. Twelve columns were assembled in this fashion and connected in series with a pump to provide fluid flow. Approximately 30 pounds (13.6 kg.) of bis (dimethyldithiocarbamoyl)disulfide (CAS# 137-26-8) in pellet form was then placed into three bag filters (5 micron bags) so that liquid is allowed to flow through the bag filters while contacting the bis(dimethyldithiocarbamoyl)disulfide. The bag filters were purchased from Filter Specialist, Inc. The bag filters were connected to the columns in series such that fluid first enters the bag filters containing the bis (dimethyldithiocarbamoyl)disulfide. In this particular experiment, the outlet and inlet were placed on the top of each column while the inlet of each bag filter was at the top and the outlet was at the bottom of each bag filter.

These twelve standard columns (untreated) were used to treat mixed photochemical solution (containing fixer, bleach-fix, and developer) until the columns failed. The columns were connected in a closed loop to a tank containing about 2500 gallons (9460 L.) of mixed photochemical solution containing 1.7 ppm silver ion. The photochemical solution in the tank was recirculated from the bottom of the tank through the columns to the top of the tank. In 16 hours, the silver concentration throughout the entire system remained at 1.7 ppm with a flow rate of 4 gallons (15.1 L.) per minute. The flow was momentarily stopped and the photochemical solution was directed from the tank bottom to the bag filters and then to the columns. The flow was resumed at 4 gallons (15.1 L.) per minute, and, within six hours, the silver ion concentration of the photochemical solution at the outlet of the columns dropped from 1.7 ppm to 0.3 ppm. The silver ion concentrations were determined by using a Perkin Elmer flame atomic absorption spectrometer.

Example 3

Activation of Iron Wool In Situ Utilizing Unitary Apparatus

A polyethylene column having an eight inch (20.3 cm.) diameter was constructed as follows in a bottom to top orientation, similar to the embodiment illustrated in FIG. 1. A polyethylene perforated disk was placed flush against the inlet port. A porous flexible container having a treatment composition thereof was then placed on top of the perforated disk. The container was made of nylon cloth, and included about 3 pounds (1.36 kg.) of bis(dimethyldithiocarbamoyl) disulfide (CAS# 137-26-8) in 3 mm. pellets, purchased Harwick Standard. A filter was then put on top of the flexible treatment composition container. The filter was made of a flexible porous polyethylene cloth having a pore size of about 1 micron. The filter was square with sides of about 10 in. (25.4 cm.). The filter was held in place by an 8 in. (20.3 cm.) diameter flexible disk (3M type 7200 pad) such that it contacts the internal diameter of the column body as a continuous band to form a seal. Iron fibers (purchased from International Steel Wool, as course iron wool) were then added to fill the column. The iron fibers allow solution flow. If a spun form of iron fibers is used, then the column was filed with 8 in. (20.3 cm.) diameter reels weighing 4 lb. (1.8 kg.) each to maximize contact of the iron with the solution. About 16 pounds (7.26 kg.) of iron wool was added, using 4 pound (1.8 kg.) formed disks of iron fibers. The disks were added one at a time into the column, and a small cloth made of nylon was used to separate each disk. Then a retaining ring was welded onto the top of the column, and the column was sealed with a top having an outlet.

Two of the above-described columns were placed in series and connected to a pumping station. The columns were configured so that the process solution was pumped into the bottom of each column (i.e., closes to the treatment composition compartment) and exiting the top of each column. Accordingly, the exit from the first column was connected to the bottom of the second column. The photochemical process solution was a combined output from a C-41R/RA-4 photo-lab (e.g., photochemical developer, fixer, and bleach-fix) that contained about 2,220 ppm of silver. The silver concentration was determined by atomic absorption. The photochemical process solution was pumped into the columns at flow rate of about 1 gallon per hour (3.8 L/hr) for a duration of about one month, 24 hrs per day, 7 days a week. About 1,000 gallons (3,800 L.) were treated by the two columns with the discharge from the columns having an average silver concentration of about 0.09 ppm. The silver ion concentrations were determined by using a Perkin Elmer flame atomic absorption spectrometer. The total silver collected was about 270 troy ounces.

What is claimed is:

1. A process for reducing the passive layer on the surface of a metal, the process comprising:
   reacting a monomeric treatment composition comprising a non-metallic compound, which comprises thiuram, with metal ions in the passive layer of a metal, thereby forming an organometallic complex precipitate; and
   removing the organometallic complex precipitate from the surface of the metal.

2. The process according to claim 1, wherein the reacting step is conducted in an aqueous solution comprising a wetting agent.

3. The process according to claim 2, wherein the non-metallic compound is a thiuram.

4. The process according to claim 1, wherein the non-metallic compound is characterized by the general chemical formula (I),

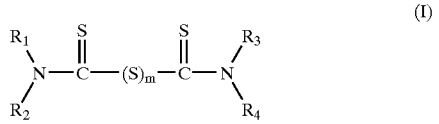

(I)

wherein, m is an integer of 1 or 2; and
$R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls.

5. The process according to claim 4, wherein the non-metallic compound is selected from the group consisting of tetramethylthiuram monosulfide, bis(dimethyldithiocarbamoyl)disulfide, tetrabenzylthiuram disulfide, tetraethylthiuram disulfide, tetrabutylthiuram disulfide, dipentamethylenethiuram tetrasulfide, and mixtures thereof.

6. The process according to claim 1, wherein the treatment composition further comprises an additional non-metallic compound that is a dithiocarbamate.

7. The process according to claim 6, wherein the additional non-metallic compound is characterized by the general chemical formula (II),

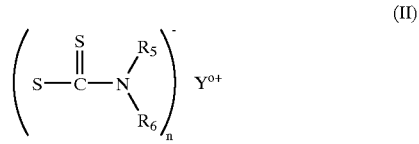

(II)

wherein, n is an integer of 1 or 2;
o is an integer of 1 or 2;
$R_5$ and $R_6$ are individually selected from the group consisting of C1–C10 linear alkyls, C3–C10 branched alkyls, C3–C10 cyclo-alkyls, and substituted and unsubstituted aryls; and
Y is an element selected from Groups IA and IIA of the periodic table.

8. The process according to claim 7, wherein the additional non-metallic compound is selected from the group consisting of sodium dimethyldithiocarbamate, sodium diethyldithiocarbamate, sodium dibenzyldithiocarbamate, sodium dibutyldithiocarbamate, and mixtures thereof.

9. The process according to claim 2, wherein the metal is selected from the group consisting of Groups IB through VIIB and VIII of the periodic table, including the elements having the atomic numbers of 58–71 and 90–103, aluminum, gallium, indium, thallium, germanium, tin, lead, antimony, bismuth, mixtures thereof and alloys thereof.

10. The process according to claim 9, wherein the metal is selected from the group consisting of silver, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, hafnium, thallium, tungsten, rhenium, osmium, iridium, platinum, gold, mixtures thereof, and alloys thereof.

11. A process for reducing the passive layer on the surface of a metal in situ, the process comprising:
    reacting, in an aqueous solution having a wetting agent, a treatment composition comprising a monomeric non-metallic compound, which comprises thiuram, with metal ions in the passive layer of a metal, thereby forming an organometallic complex precipitate; and
    removing the organometallic complex precipitate from the surface of the metal.

12. The process according to claim 11, wherein the aqueous solution is an aqueous process solution.

13. The process according to claim 11, wherein the non-metallic compound is a thiuram.

14. The process according to claim 11, wherein the non-metallic compound is characterized by the general chemical formula (I),

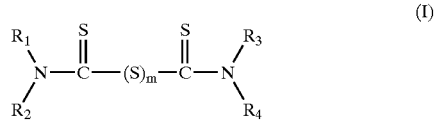

(I)

wherein, m is an integer of 1 or 2; and
$R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls.

15. The process according to claim 14, wherein the non-metallic compound is selected from the group consisting of tetramethylthiuram monosulfide, bis(dimethyldithiocarbamoyl)disulfide, tetrabenzylthiuram disulfide, tetraethylthiuram disulfide, tetrabutylthiuram disulfide, dipentamethylenethiuram tetrasulfide, and mixtures thereof.

16. The process according to claim 11, wherein the treatment composition further comprises an additional non-metallic compound that is a dithiocarbamate.

17. The process according to claim 16, wherein the additional non-metallic compound is characterized by the general chemical formula (II),

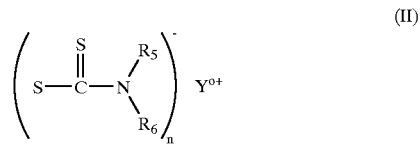

(II)

wherein, n is an integer of 1 or 2;
o is an integer of 1 or 2;
$R_5$ and $R_6$ are individually selected from the group consisting of C1–C10 linear alkyls, C3–C10 branched alkyls, C3–C10 cyclo-alkyls, and substituted and unsubstituted aryls; and Y is an element selected from Groups IA and IIA of the periodic table.

18. The process according to claim 17, wherein the additional non-metallic compound is selected from the group consisting of sodium dimethyldithiocarbamate, sodium diethyldithiocarbamate, sodium dibenzyldithiocarbamate, sodium dibutyldithiocarbamate, and mixtures thereof.

19. The process according to claim 11, wherein the metal is selected from the group consisting of Groups IB through VIIB and VIII of the periodic table, including the elements having the atomic numbers of 58–71 and 90–103, aluminum, gallium, indium, thallium, germanium, tin, lead, antimony, bismuth, mixtures thereof and alloys thereof.

20. The process according to claim 19, wherein the metal is selected from the group consisting of silver, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, hafnium, thallium, tungsten, rhenium, osmium, iridium, platinum, gold, mixtures thereof, and alloys thereof.

* * * * *

UNITED STATES PATENT AND TRADEMARK OFFICE
CERTIFICATE OF CORRECTION

PATENT NO. : 6,855,259 B2 Page 1 of 1
APPLICATION NO. : 10/211471
DATED : February 15, 2005
INVENTOR(S) : Peter Morton It is certified that error appears in the above-identified patent and that said Letters Patent is hereby corrected as shown below:

Title page; item (56): col. 2;

Seventh foreign patent document listed should read JP066275 with a publication date of March 1997.

Please see attached Request for Certificate of Correction Pursuant to 35 USC Section 255.

Signed and Sealed this

First Day of July, 2008

JON W. DUDAS
*Director of the United States Patent and Trademark Office*